(12) United States Patent
Kumar et al.

(10) Patent No.: US 11,669,795 B2
(45) Date of Patent: *Jun. 6, 2023

(54) COMPLIANCE MANAGEMENT FOR EMERGING RISKS

(71) Applicant: Capital One Services, LLC, McLean, VA (US)

(72) Inventors: Lokesh Vijay Kumar, Frisco, TX (US); Satish Chikkaveerappa, McKinney, TX (US); Sasi Kumar Unnikrishnan, Plano, TX (US); Venkata Satya Parcha, McLean, VA (US); Ponnazhakan Subramanian, McKinney, TX (US); Rhic Chowdhury, KA (IN); Nimish Mangal, Uttar Pradesh (IN); Ryan M. Parker, Dallas, TX (US); Jacob Adair, Frisco, TX (US); Chris Demchalk, Frisco, TX (US); Lavika Aggarwal, HR (IN); Nishant Sinha, KA (IN)

(73) Assignee: Capital One Services, LLC, McLean, VA (US)

(*) Notice: Subject to any disclaimer, the term of this patent is extended or adjusted under 35 U.S.C. 154(b) by 153 days.

This patent is subject to a terminal disclaimer.

(21) Appl. No.: 17/121,230

(22) Filed: Dec. 14, 2020

(65) Prior Publication Data
US 2021/0174277 A1    Jun. 10, 2021

Related U.S. Application Data

(63) Continuation of application No. 16/536,678, filed on Aug. 9, 2019, now Pat. No. 10,867,268.

(51) Int. Cl.
*G06Q 10/00* (2023.01)
*G06Q 10/0635* (2023.01)
(Continued)

(52) U.S. Cl.
CPC ... *G06Q 10/0635* (2013.01); *G06F 16/90335* (2019.01); *G06F 16/95* (2019.01);
(Continued)

(58) Field of Classification Search
None
See application file for complete search history.

(56) References Cited

U.S. PATENT DOCUMENTS 7,389,265 B2 * 6/2008 Lawrence ............... G06F 16/95
705/38
7,716,077 B1 * 5/2010 Mikurak ............ G06Q 10/0631
705/7.12
(Continued)

OTHER PUBLICATIONS

Crook, Jonathan N., David B. Edelman, and Lyn C. Thomas. "Recent developments in consumer credit risk assessment." European Journal of Operational Research 183.3 (2007): 1447-1465. (Year: 2007).*

(Continued)

*Primary Examiner* — Gurkanwaljit Singh
(74) *Attorney, Agent, or Firm* — Sterne, Kessler, Goldstein & Fox PL.L.C.

(57) ABSTRACT

Disclosed herein are system, method, and computer program product embodiments for identifying and managing emerging risks. Businesses, such as those participating in regulated industries, may need to regularly monitor enforcement actions that are cited in a variety of sources. Embodiments disclosed herein provide for scraping information from those sources and comparing it to existing risk events in order to determine possible discrepancies that should be assessed.

16 Claims, 5 Drawing Sheets

(51) Int. Cl.
*G06Q 30/01* (2023.01)
*G06Q 30/0282* (2023.01)
*G06F 21/62* (2013.01)
*G06F 40/30* (2020.01)
*G06Q 10/067* (2023.01)
*G06F 16/903* (2019.01)
*G06Q 10/10* (2023.01)
*G06F 16/95* (2019.01)

(52) U.S. Cl.
CPC .......... *G06F 21/6209* (2013.01); *G06F 40/30* (2020.01); *G06Q 10/067* (2013.01); *G06Q 10/103* (2013.01); *G06Q 30/01* (2013.01); *G06Q 30/0282* (2013.01)

(56) References Cited

U.S. PATENT DOCUMENTS

| | | | | |
|---|---|---|---|---|
| 8,204,879 | B2* | 6/2012 | Doyle | G06F 16/00 707/727 |
| 8,887,286 | B2* | 11/2014 | Dupont | G06F 21/50 726/25 |
| 9,262,517 | B2 | 2/2016 | Feng et al. | |
| 9,633,403 | B2* | 4/2017 | Mohanty | G06Q 40/06 |
| 9,721,229 | B1 | 8/2017 | Hernandez et al. | |
| 9,824,321 | B2 | 11/2017 | Raghunathan et al. | |
| 9,836,599 | B2* | 12/2017 | Sheldon | G06F 21/554 |
| 10,269,372 | B1 | 4/2019 | Fiedler et al. | |
| 10,289,678 | B2* | 5/2019 | Parikh | G06F 40/274 |
| 10,367,942 | B2 | 7/2019 | Klein et al. | |
| 10,410,136 | B2 | 9/2019 | Zhang et al. | |
| 10,417,350 | B1 | 9/2019 | Mohamed et al. | |
| 10,467,717 | B2 | 11/2019 | Cai et al. | |
| 10,530,930 | B2 | 1/2020 | St-Cyr et al. | |
| 10,867,268 | B1 | 12/2020 | Kumar et al. | |
| 2002/0138371 | A1* | 9/2002 | Lawrence | G06Q 30/02 705/26.1 |
| 2002/0143562 | A1* | 10/2002 | Lawrence | G06Q 40/08 705/311 |
| 2003/0233278 | A1* | 12/2003 | Marshall | G06Q 30/00 705/14.35 |
| 2004/0243588 | A1* | 12/2004 | Tanner | G06F 16/2471 |
| 2008/0319922 | A1* | 12/2008 | Lawrence | G06F 16/24 705/36 R |
| 2010/0076962 | A1* | 3/2010 | Doyle | G06F 16/00 707/769 |
| 2010/0100427 | A1* | 4/2010 | McKeown | G06Q 10/067 705/320 |
| 2010/0205014 | A1* | 8/2010 | Sholer | G06Q 40/08 705/4 |
| 2012/0137367 | A1* | 5/2012 | Dupont | G06F 21/00 726/25 |
| 2012/0316916 | A1 | 12/2012 | Andrews et al. | |
| 2013/0232156 | A1 | 9/2013 | Dunn et al. | |
| 2016/0359915 | A1* | 12/2016 | Gupta | H04L 43/04 |
| 2017/0019291 | A1 | 1/2017 | Tapia et al. | |
| 2017/0075978 | A1 | 3/2017 | Zhang et al. | |
| 2017/0076225 | A1 | 3/2017 | Zhang et al. | |
| 2017/0098169 | A1 | 4/2017 | Gupta et al. | |
| 2017/0255700 | A1 | 9/2017 | Shiffman et al. | |
| 2017/0300472 | A1* | 10/2017 | Parikh | G06F 40/205 |
| 2017/0372038 | A1 | 10/2017 | Gupta et al. | |
| 2018/0027006 | A1* | 1/2018 | Zimmermann | G06F 21/6218 726/11 |
| 2018/0053128 | A1 | 2/2018 | Costas | |
| 2018/0174446 | A1* | 6/2018 | Wang | G08G 1/096716 |
| 2019/0121808 | A1 | 4/2019 | Chadha et al. | |
| 2019/0220512 | A1* | 7/2019 | Parikh | G06F 40/274 |
| 2020/0304364 | A1 | 9/2020 | Tapia et al. | |
| 2020/0387570 | A1 | 12/2020 | Biswas et al. | |
| 2021/0192292 | A1 | 6/2021 | Zhai | |

OTHER PUBLICATIONS

Del Prette, Zilda Aparecida Pereira, et al. "Role of social performance in predicting learning problems: Prediction of risk using logistic regression analysis." School Psychology International 33.6 (2012): 615-630. (Year: 2012).*

Ganguly, Saptarshi, et al. "Digital risk: Transforming risk management for the 2020 s." McKinsey Insights (2017). (Year: 2017).*

* cited by examiner

COMPLIANCE MANAGEMENT FOR EMERGING RISKS

CROSS-REFERENCE TO RELATED APPLICATIONS

This application is a continuation of U.S. application Ser. No. 16/536,678, entitled "COMPLIANCE MANAGEMENT FOR EMERGING RISKS," filed Aug. 9, 2019, which is incorporated by reference herein in its entirety.

BACKGROUND

For many businesses, identifying and dealing with customer complaints is a priority. This includes identifying these complaints on third party websites and addressing them before they cause reputational damage to the business.

However, in some lines of business, the potential issues may be larger than reputational—regulatory risk exposure may be involved, for example. Given the number of possible sources of risk, approaches are needed to better understand and manage the businesses exposure to these risks.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for identifying and managing emerging risks.

Businesses in many industries need to deal with emerging risks of possible enforcement actions. For example, businesses in the heavily-regulated banking industry must be aware of possible regulatory violations they have committed. And, beyond being aware of these possible violations, they must properly weigh the risks of these violations in terms of how they should be addressed.

Presently, businesses handle such tasks mostly manually. For example, such businesses may manually log possible regulatory violations for follow up. Separately, such businesses may subscribe to various publications that provide updates on regulatory enforcement actions relevant to the operation of those businesses. News publications, aggregators, and government websites may supply updates on the various enforcement actions, and need to either be visited manually or digests of updates reviewed manually. Not only is this process time consuming, but also prone to error—typically a failure to identify and properly appraise risk.

Figure 1:
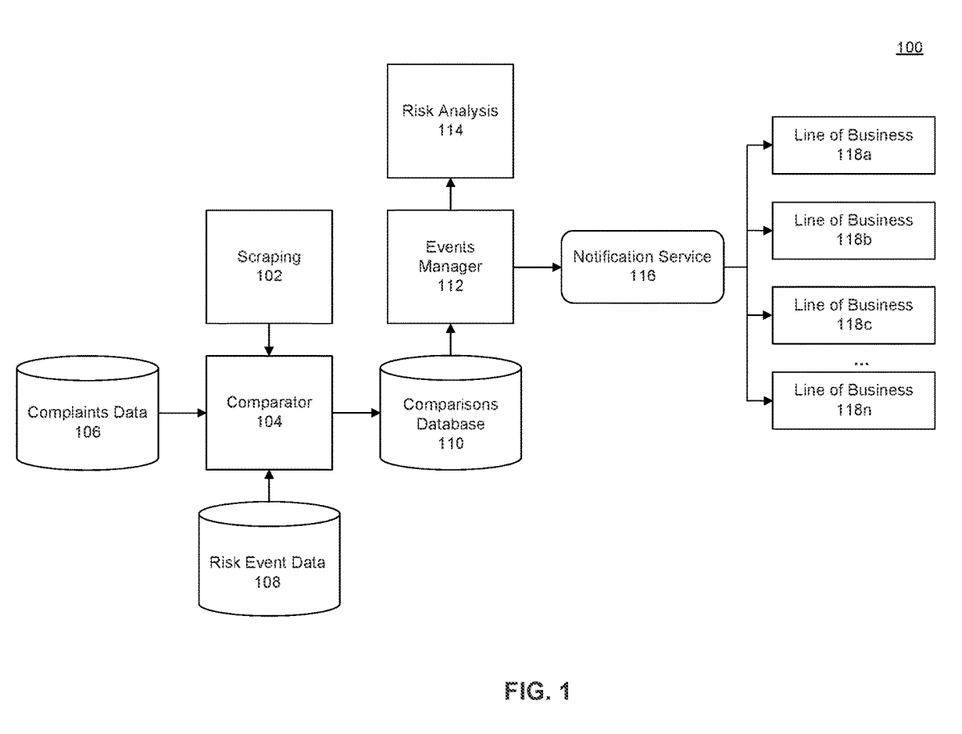
FIG. 1 illustrates a risk assessment process flow, in accordance with an embodiment.

FIG. 1 illustrates a risk assessment process flow 100, in accordance with an embodiment. Flow 100 incorporates various elements that may be executed in a variety of contexts, including locally or remotely to a common system, as well as within a cloud-based architecture. A skilled artisan will appreciate that the precise architecture of a system implementing flow 100 will therefore vary depending on where the elements of flow 100 are executed.

Scraping module 102 provides access to websites and other document sources of enforcement information, in accordance with an embodiment. Scraping module 102 accesses these document sources and obtains key details regarding these various documents. By way of non-limiting example, these details may include a regulatory citation to which an enforcement action described in the document relates.

Comparator module 104 uses these scraped details and compares them to sources of risk information to determine whether risks are present, in accordance with an embodiment. By way of non-limiting example, comparator module 104 uses the regulatory citation details from a document scraped by scraping module 102 to compare with regulatory citations associated with a risk.

In accordance with an embodiment, sources of risk information may include complaints data 106 and risk event data 108. Complaints data 106 may include complaints made directly to a business operating process flow 100, or on a separate platform and obtained by a scraping mechanism like (or including) scraping module 102. Risk event data 108 includes known risk events, such as possible regulatory violations that the business may have incurred—but perhaps has not yet had an enforcement action brought against it for the same. These risk events of risk event data 108 may be entered a variety of ways, including through manual entry.

As noted above, comparator module 104 compares the scraped details from scraping module 102 with risk information, such as risk information from complaints data 106 and risk event data 108. In accordance with an embodiment, comparator module 104 matches an identified regulatory citation from a scraped document identified by scraping module 102 to a regulatory citation of risk information from complaints data 106 or risk event data 108.

However regulatory citation information may not be immediately available and associated with either the scraped documents or the risk information. In accordance with an embodiment, the scraped documents or the risk information may be searched for regulatory citations. Regulatory citations typically have a regular form, and can be identified through the use of, by way of non-limiting example, regulatory expressions.

In accordance with an embodiment, comparator 104 may compare scraped documents with risk information on the basis of classification information. This classification information may, in accordance with a further embodiment, relate to a specific regulatory citation, although a skilled artisan will appreciate that other classifications may be used. Additionally, the classification information may form a basis for comparing with a regulatory citation. For example, if the scraped document contains a regulatory citation, but the risk information does not, a classification for the risk information may suggest a corresponding regulatory citation for that classification that can be used for comparison purposes.

Classification of documents, including scraped documents provided by scraping module 102 and risk information from complaints data 106 or risk event data 108, may be performed through a variety of mechanisms, including keyword-based classification, or manual classification.

However, in accordance with an embodiment, classification is performed in accordance with document classification approaches discussed in U.S. patent application Ser. No. 16/536,645, entitled "SEARCH PATTERN SUGGESTIONS FOR LARGE DATASETS," filed Aug. 9, 2019, and incorporated herein by reference in its entirety. For example, phrase-based scoring may be employed against a full set of documents in order to determine a classification for the scraped documents and risk information.

Comparator module 104 may then store this relationship between scraped documents and risk information in comparisons database 110, in accordance with an embodiment. In accordance with an embodiment, this relationship is termed a discrepancy.

In accordance with a further embodiment, comparator module 104 may perform a comparison of complaints data 106 directly to risk event data 108. This comparison may proceed again in accordance with the above classification approach, and the results of this comparison would again be stored as discrepancies in comparisons database 110.

Events manager 112 is an exemplary component configured to access the discrepancies stored in comparisons database 110 in order to facilitate assessment of risks presented by the discrepancies, in accordance with an embodiment. Event manager 112 may provide access to comparisons database 110 to a risk analysis module 114, in accordance with an embodiment. Access to risk analysis module 114 may be provided by way of a user interface (e.g., a graphical user interface (GUI)) accessible to a risk analyst. The user interface may present the discrepancies to the risk analyst for the purpose of prioritizing a risk level for each discrepancy, further classification of the discrepancies, or otherwise interacting with the discrepancies. A skilled artisan will appreciate that any manner of visualizing and interacting with discrepancies stored in comparisons database 110 is contemplated within the scope of this disclosure.

Additionally, a notification service 116 may access discrepancies from events manager 112 for the purpose of notifying relevant actors of relevant discrepancies. For example, as shown in flow 100, various lines of business 118a-118n (collectively, lines of business 118) may be interested in discrepancies as they are added to comparisons database 110. These lines of business 118 may register with notification service 116 in order to receive updates of the relevant discrepancies.

Relevance of the discrepancies may be determined, by way of non-limiting example, on the basis of the classification associated with the underlying documents and risk information for a discrepancy. As previously noted, this classification may be determined as described in U.S. patent application Ser. No. 16/536,645, entitled "SEARCH PATTERN SUGGESTIONS FOR LARGE DATASETS," filed Aug. 9, 2019, filed concurrently herewith and incorporated herein by reference in its entirety. Additionally, relevance of the discrepancies may be determined on the basis of other information used for performing comparisons by comparator 104, such as regulatory citations as described above.

Figure 2:
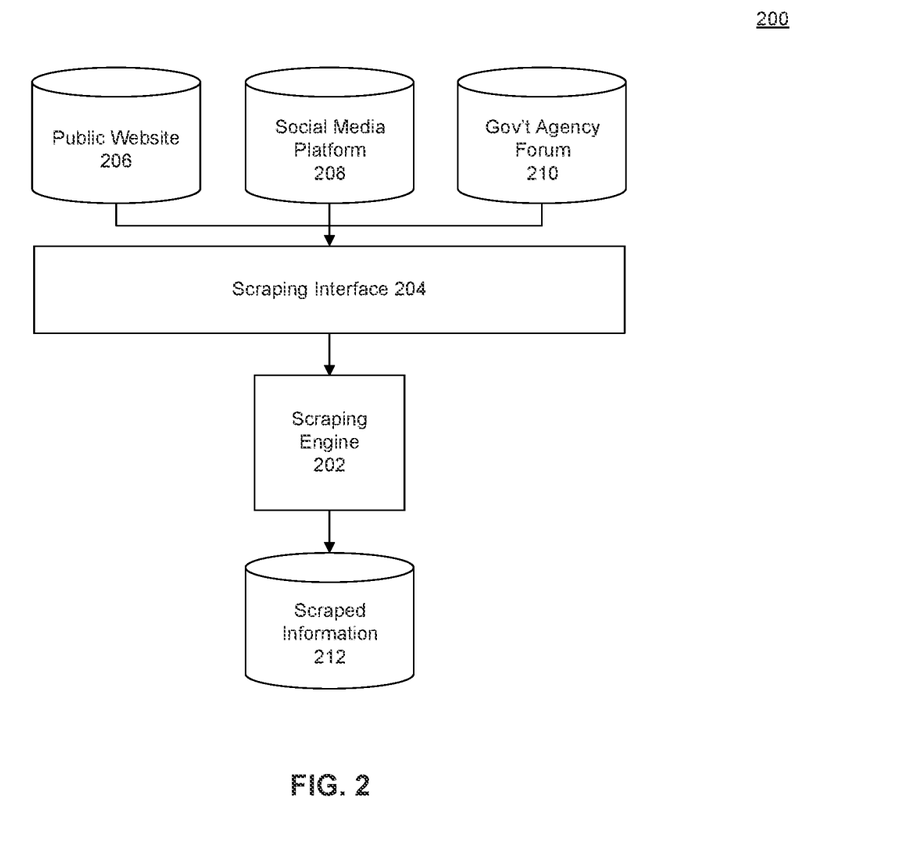
FIG. 2 illustrates a scraping module, in accordance with an embodiment.

FIG. 2 illustrates a scraping module 200, in accordance with an embodiment. By way of non-limiting example, scraping module 200 may be employed as scraping module 102 of flow 100 of FIG. 1. Scraping module 200 is used to provide scraped information 212 from various sources, such as public websites 206, social media platforms 208, and government agency forums 210, by way of a non-limiting example.

Each source of information may be arranged in a variety of different ways, and may not itself provide an interface for directly accessing relevant information to be accessed. Accordingly, a scraping interface 204 may be provided, in accordance with an embodiment. In an embodiment, scraping interface 204 provides the ability to read text information from sources, such as sources 206, 208, and 210. By way of non-limiting example, scraping interface 204 may look for fields within a markup language document that contain relevant text. By way of further non-limiting example, scraping interface 204 may include optical character recognition (OCR) capabilities for obtaining text from scanned documents, such as portable document format (PDF) documents.

Scraping interface 204 provides the scraped text to scraping engine 202, in accordance with an embodiment. Scraping engine 202 may perform scraping tasks in order to extract relevant information from the scraped text. For example, scraping engine 202 may identify regulatory citations within the scraped text. In another example, scraping engine 202 may perform classification of the scraped text. And in yet another example, scraping engine 202 may summarize the scraped text using phrase extraction. Classification and phrase extraction of the scraped text may be performed as described in U.S. patent application Ser. No. 16/536,645, entitled "SEARCH PATTERN SUGGESTIONS FOR LARGE DATASETS," filed Aug. 9, 2019, filed concurrently herewith and incorporated herein by reference in its entirety.

The results of scraping engine 202, such as classification information, extracted phrases, regulatory citations within the scraped text, and any other relevant information obtained, may then be stored as scraped information 212, such as in a database, in accordance with an embodiment. Scraped information 212 may then be accessed by other modules, such as comparator 104 of FIG. 1.

Figure 3:
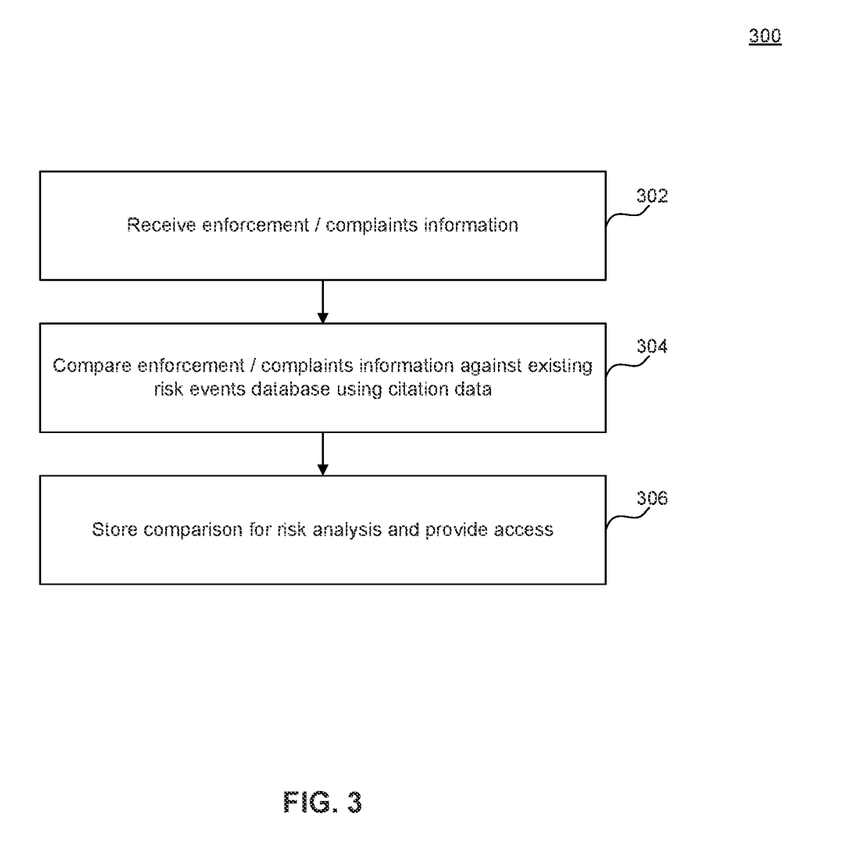
FIG. 3 is a flowchart illustrating steps by which risks are identified, in accordance with an embodiment.

FIG. 3 is a flowchart 300 illustrating steps by which risks are identified, in accordance with an embodiment. The process begins at step 302 where enforcement or complaints information is received. Referring again to FIG. 1, enforcement or complaints information is received at comparator 104 from either scraping module 102 or complaints data 106, in accordance with an embodiment.

At step 304, this enforcement or complaints information is compared against existing risk events using citation data, in accordance with an embodiment. In accordance with a further embodiment, this citation data is determined based on classification of the enforcement or complaints information and of the existing risk events. By way of non-limiting example, this comparison is performed by comparator 104 of FIG. 1.

At step 306, the results of this comparison are stored as discrepancies for risk analysis purpose, and access is provided in order to perform this analysis. By way of non-limiting example, the discrepancies are stored by comparator 104 of FIG. 1 in comparisons database 110 of FIG. 1, and access is provided to events manager 112 of FIG. 1.

Figure 4:
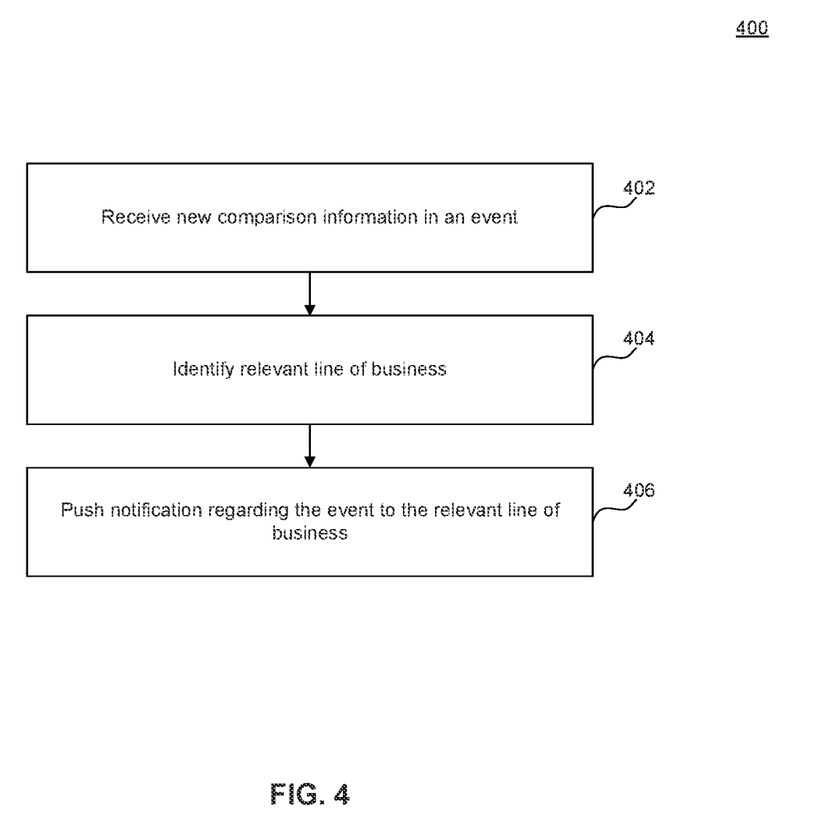
FIG. 4 is a flowchart illustrating steps by which a notification service may provide subscribers with relevant risk event information, in accordance with an embodiment.

FIG. 4 is a flowchart 400 illustrating steps by which a notification service may provide subscribers with relevant risk event information, in accordance with an embodiment. The process begins at step 402 where new comparison information is received in an event. By way of non-limiting example, this event is a discrepancy that has been added to a comparisons database, such as comparisons database 110 of FIG. 1 and identified as a new addition by an events manager, such as events manager 112 of FIG. 1.

The process continues to step 404 where a relevant line of business is identified for the event, and at step 406 a notification is pushed to the relevant line of business, in accordance with an embodiment. By way of non-limiting example, a relevant line of business may be determined based on a classification or a regulatory citation of the discrepancy as described above.

Figure 5:
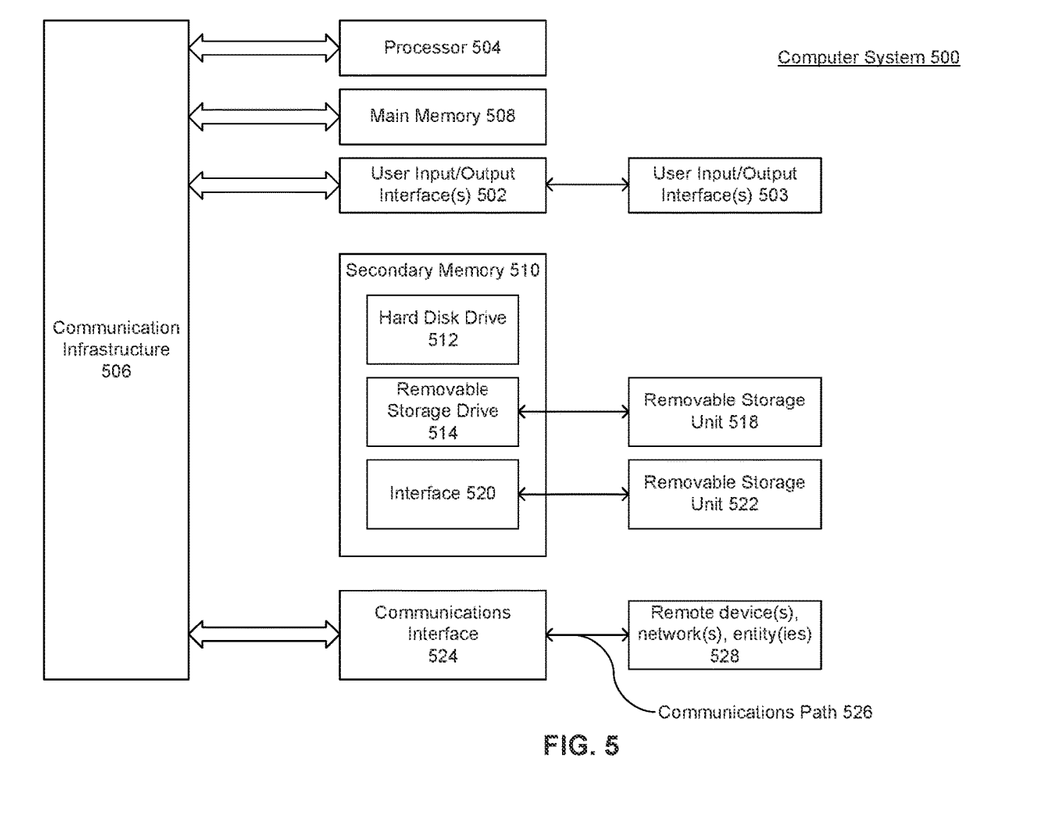
FIG. 5 is an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:
   connecting, by one or more computing devices, a scraping interface to an enforcement information source;
   scraping, by the scraping interface, enforcement information from the enforcement information source;
   applying, by the one or more computing devices, a regular expression search to the enforcement information from the enforcement information source to identify first citation data formatted according to a regular form for regulatory citations within the enforcement information;
   determining, by the one or more computing devices, a classification for the enforcement information associated with the first citation data;
   classifying, by the one or more computing devices, a risk information document to determine a classification for the risk information document using phrase-based scoring on the contents of the risk information document, wherein the classification for the risk information document is associated with second citation data conforming to the regular form for regulatory citations;
   comparing, by the one or more computing devices, the first citation data against the second citation data of the risk information document to determine a correspondence between the classification for the enforcement information and the classification for the risk information document;
   storing, by the one or more computing devices, the enforcement information in association with the risk information document, based on a match between the first citation data and the second citation data; and
   presenting in an interface, by the one or more computing devices, a plurality of discrepancies, wherein the plurality of discrepancies includes a discrepancy based on the association of the enforcement information with the risk information document; and
   permitting, by the one or more computing devices, arrangement of the plurality of discrepancies on the interface according to a risk level.

2. The computer implemented method of claim 1, wherein the enforcement information source comprises a database of a plurality of enforcement actions.

3. The computer implemented method of claim 1, wherein the enforcement information source comprises a database of a plurality of complaints.

4. The computer implemented method of claim 1, further comprising:
   selecting, by the one or more computing devices, a line of business from a plurality of lines of business corresponding to the classification for the risk information document; and
   notifying, by the one or more computing devices, the line of business of the association of the enforcement information with the risk information document.

5. The computer implemented method of claim 1, wherein classifying the risk information document using phrase-based scoring on the contents of the risk information document comprises:
   determining, by the one or more computing devices, the classification of the risk information document by performing the phrase-based scoring against a plurality of risk information documents selected from a plurality of classifications.

6. A system, comprising:
   a memory configured to store operations; and
   one or more processors configured to perform the operations, the operations comprising:
      connecting a scraping interface to an enforcement information source;
      scraping, by the scraping interface, enforcement information from the enforcement information source;
      classifying the enforcement information to determine a classification for the enforcement information using phrase-based scoring on the contents of the enforcement information, wherein the classification for the enforcement information is associated with first citation data conforming to a regular form for regulatory citations;
      classifying a risk information document to determine a classification for the risk information document using phrase-based scoring on the contents of the risk information document, wherein the classification for the risk information document is associated with second citation data conforming to the regular form for regulatory citations;
      comparing the first citation data of the enforcement information against the second citation data of the risk information document to determine a correspondence between the classification for the enforcement information and the classification for the risk information document;

storing the enforcement information in association with the risk information document, based on a match between the first citation data and the second citation data; and presenting in an interface, by the one or more processors, a plurality of discrepancies, wherein the plurality of discrepancies includes a discrepancy based on the association of the enforcement information with the risk information document; and permitting, by the one or more processors, arrangement of the plurality of discrepancies on the interface according to a risk level.

7. The system of claim 6, wherein the enforcement information source comprises a database of a plurality of enforcement actions.

8. The system of claim 6, wherein the enforcement information source comprises a database of a plurality of complaints.

9. The system of claim 6, the operations further comprising:

selecting a line of business from a plurality of lines of business corresponding to the classification for the risk information document; and notifying the line of business of the association of the enforcement information with the risk information document.

10. The system of claim 6, wherein classifying the risk information document using phrase-based scoring on the contents of the risk information document comprises:

determining the classification of the risk information document by performing the phrase-based scoring against a plurality of risk information documents selected from a plurality of classifications.

11. The system of claim 6, wherein classifying the enforcement information using phrase-based scoring on the contents of the enforcement information comprises:

determining the classification of the enforcement information by performing the phrase-based scoring against a plurality of enforcement information documents selected from a plurality of classifications.

12. A computer readable storage device having instructions stored thereon, execution of which, by one or more processing devices, causes the one or more processing devices to perform operations comprising:

determining that a risk event has occurred based on a presence of enforcement information stored in association with a risk information document in a storage; and retrieving the enforcement information and the risk information document;

presenting in an interface, by the one or more processing devices, a plurality of discrepancies, wherein the plurality of discrepancies includes a discrepancy based on the association of the enforcement information with the risk information document; and permitting, by the one or more processing devices, arrangement of the plurality of discrepancies on the interface according to a risk level; and wherein the enforcement information is from an enforcement information source and is associated with the risk information document based on a match between first citation data of the enforcement information and second citation data of the risk information document to determine a correspondence between a classification for the enforcement information and a classification for the risk information document, wherein the classification for the enforcement information is determined using phrase-based scoring on the contents of the enforcement information, the classification for the enforcement information associated with the first citation data conforming to a regular form for regulatory citations, and wherein the classification for the risk information document is determined using phrase-based scoring on the contents of the risk information document, the classification for the risk information document associated with the second citation data conforming to the regular form for regulatory citations.

13. The computer readable storage device of claim 12, wherein the enforcement information source comprises a database of a plurality of enforcement actions.

14. The computer readable storage device of claim 12, the operations further comprising:

selecting a line of business from a plurality of lines of business corresponding to the classification for the risk information document; and notifying the line of business of the association of the enforcement information with the risk information document.

15. The computer readable storage device of claim 12, wherein the phrase-based scoring on the contents of the risk information document comprises phrase-based scoring against a plurality of risk information documents selected from a plurality of classifications.

16. The computer readable storage device of claim 12, wherein the phrase-based scoring on the contents of the enforcement information comprises phrase-based scoring against a plurality of enforcement information documents selected from a plurality of classifications.

* * * * *